Sept. 29, 1959      P. N. NELSON      2,905,995
ANCHORAGE DEVICE FOR FLEXIBLE LINE
Filed Jan. 13, 1955      2 Sheets-Sheet 1
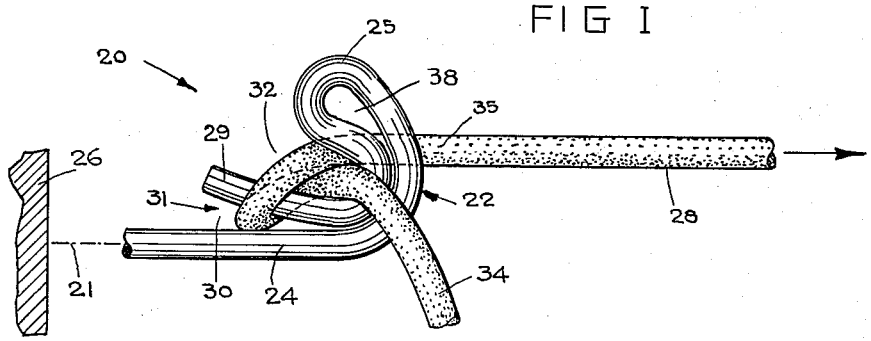
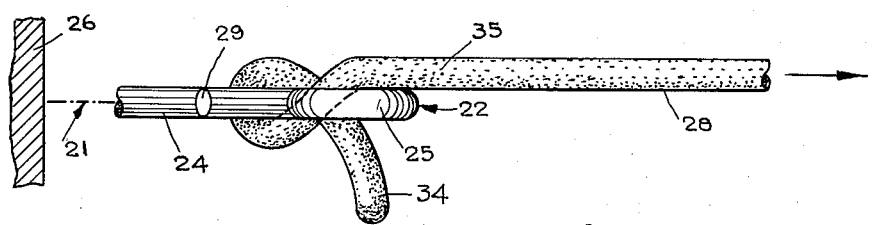
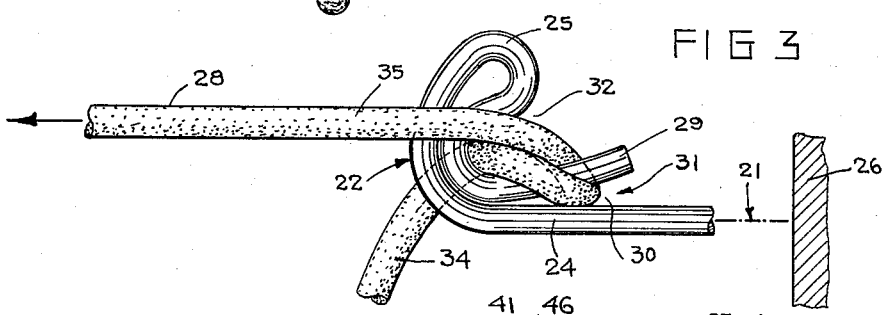
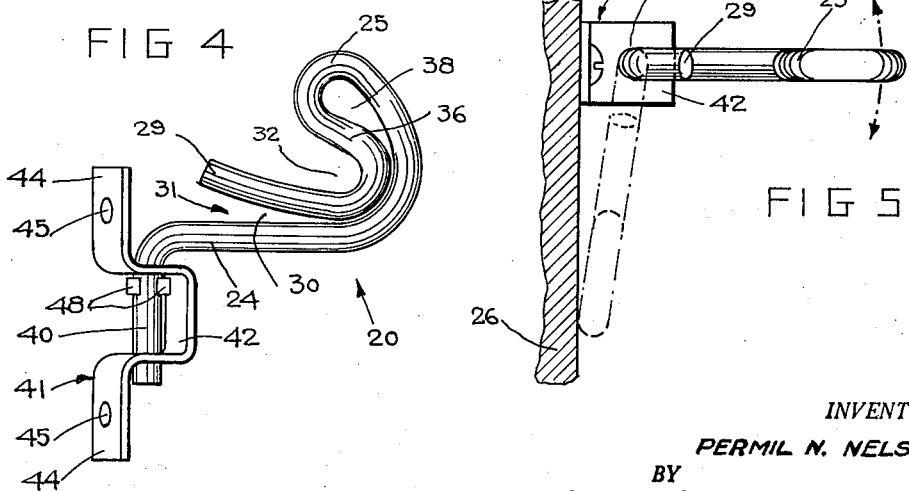
INVENTOR.
PERMIL N. NELSON
BY
Carlson, Pitzner, Hubbard & Wolfe
ATTORNEYS Sept. 29, 1959      P. N. NELSON      2,905,995
ANCHORAGE DEVICE FOR FLEXIBLE LINE
Filed Jan. 13, 1955      2 Sheets-Sheet 2
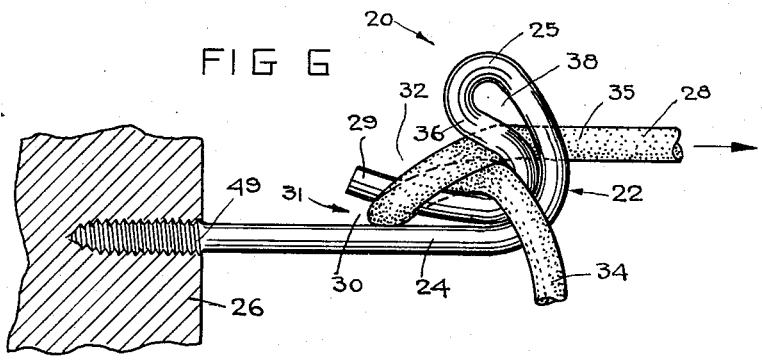
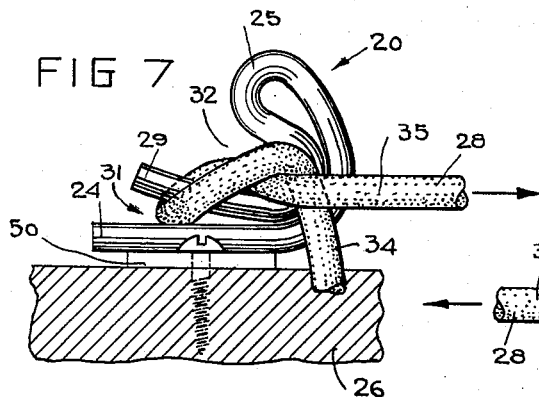
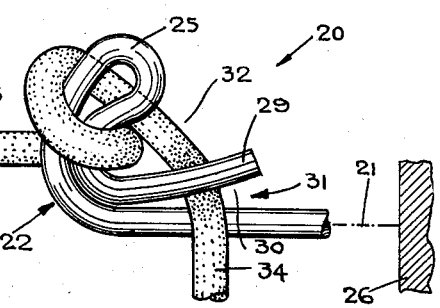
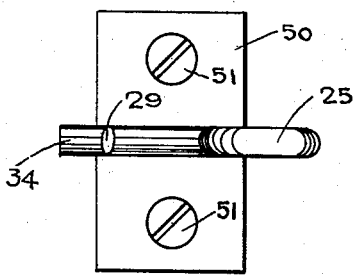
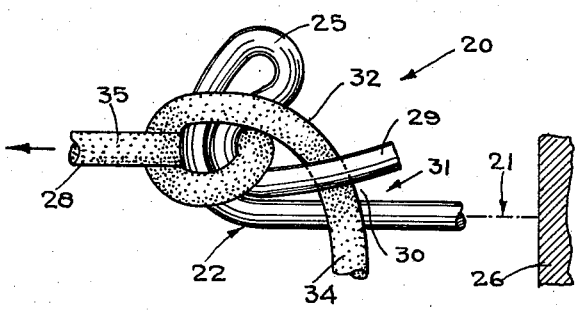
INVENTOR.
PERMIL N. NELSON
BY
Carlson, Pitzner, Hubbard & Wolfe
ATTORNEYS

United States Patent Office 2,905,995
Patented Sept. 29, 1959

2,905,995

ANCHORAGE DEVICE FOR FLEXIBLE LINE

Permil N. Nelson, Galesburg, Ill., assignor to
Lynn H. Ewing, Rock Island, Ill.

Application January 13, 1955, Serial No. 481,628

1 Claim. (Cl. 24—131)

The present invention relates in general to the field of hardware, and, more specifically, to a novel anchorage device for a flexible line such as a cord or a rope.

One object of the invention is to provide an anchorage device of hooklike form and to which a line can be securely fastened with a hitch of the simplest kind.

Another object is to provide an anchorage device of the character set forth and which holds the line effectively without the use of latches, springs, or other ancillary elements.

A further object is to provide an anchorage device of the foregoing type and which is of simple, economical construction, capable of being manufactured on a mass production basis, and applicable to a wide variety of specific uses such as clothesline hardware, boat fittings, and tarpaulin tie fittings for trucks and trailers.

Other objects and advantages of the invention will become apparent as the following description proceeds, taken together with the accompanying drawings, in which:

Figure 1 is a side elevation of an anchorage device embodying the invention, the support and means for attaching the device to the support being indicated diagrammatically.

Fig. 2 is a plan view of the device shown in Fig. 1.

Fig. 3 is an elevation of the device as shown in Fig. 1 but taken from the opposite side.

Fig. 4 is a side elevation of an anchorage device having a line engaging portion similar to that of the device shown in Fig. 1 but equipped with a swivel support which is shown in perspective.

Fig. 5 is a plan view of the anchorage device shown in Fig. 4, the device in this instance being fastened to a vertical supporting surface.

Fig. 6 is a view similar to Fig. 1 but showing a modified form of the anchorage device having a threaded mounting shank and having the line pulled taut.

Figs. 7 and 8 are side elevation and plan views, respectively, of a further modified form of anchorage device also embodying the invention, the device being equipped with a mounting pad and having a line secured with an alternative form of hitch.

Figs. 9 and 10 are views similar to Fig. 1 but illustrating other alternative hitches which may be used in securing the line to the anchorage device.

While the invention is susceptible of various modifications and alternative constructions, certain illustrative embodiments have been shown in the drawings and will be described below in considerable detail. It should be understood, however, that there is no intention to limit the invention to the specific forms or modes disclosed, but, on the contrary, the intention is to cover all modifications, alternative constructions and equivalents falling within the spirit and scope of the invention as expressed in the appended claim.

In Figs. 1, 2 and 3, there is shown a slip-proof hook 20 comprising a mounting means 21 and a line-engaging portion 22. The latter includes a supporting stem 24 with an upturned toe 25 situated at one end thereof. Since the mounting means 21 may be given a variety of specific forms, it has been represented diagrammatically by a dot-dash line. The hook 20 is secured by its mounting means 21 to an appropriate fixed support 26, also shown diagrammatically. The support 26 may, for example, be part of a building wall, a post, a floor joist, or a boat deck and need not necessarily be vertically disposed. Attached to the hook 20 is a flexible line 28 such as a cord, rope, or clothesline.

Provision is made in the hook 20 for receiving the flexible line 28 in a manner permitting quick and secure attachment thereof with a very simple hitch, as well as quick and easy detachment thereof, without inflicting damage on the line. This is accomplished by fashioning the hook 20 with a prong 29 disposed at an acute angle to the stem 24 and oriented so as to converge toward the toe end of the stem. The prong 29 is separated from the stem 24 by wedge-shaped slot 30 and, together with the stem, defines a V-clamp 31. The prong 29 is separated from the toe 25 by a relatively blunt hook recess or throat 32, the toe 25 overlying at least a portion of the recess 32. The arrangement is such that the wedge-shaped slot 30 and the hook recess 32 are similarly oriented and open out in the same general direction, namely, away from the toe 25.

The line 28 may be quickly secured to the hook 20 by carrying out the few simple steps which follow. First, the line is led through the wedge-shaped slot 30 of V-clamp 31 and drawn hard against the smaller end of the slot 30. One end portion 34 of the line 28 is bent reversely about the prong 29 and then led through the hook recess or throat 32. The other end portion 35 of the line 28 is also bent reversely about the prong 29 and then led through the throat 32 in the opposite direction and in overlying relation with the first end portion 34. When this has been done, the line 28 is in the condition illustrated in Figs. 1, 2 and 3 and secured with a very simple hitch. When the hitch has been drawn taut by tension applied in the direction of the arrows, it remains firmly secured to the hook 20 in slip-proof relation therewith.

In the present instance, provision is made in the hook 20 for enhancing its holding power on the line 28. This is accomplished by imparting a limited resiliency to the prong 29 in such a manner that tension on the line end 35 serves to increase the squeeze imparted to the line by the V-clamp 31. In keeping with such objective, the toe 25 is extended in a double reverse or S-shaped bend 36 shown in Fig. 4 and the prong 29 is situated at the end of such bend. The parts are so arranged that an eye 38 is created near the end of the toe and the material in the second bend which defines the bottom of the throat 32 is spaced a slight amount from the curved portion of the stem 24. With the hitch in the condition shown in Figs. 1, 2 and 3, as the hitch "cinches up" due to tension on the line end portion 35, the double bend portion 36 and the prong 29 deflect slightly toward the stem 24. Such deflection is due to a component of the line tension and which acts at the throat 32 in a downward direction, forcing the prong 29 closer to the stem 34 and increasing the squeeze on the line 28.

Regardless of how tight the hitch may be drawn, it can be quickly and easily undone. This may be accomplished by the simple expedient of grasping the hook 20 at the base of the toe 25 between the thumb and forefinger and then pushing the hitch along the prong 29 toward the free end thereof. The hitch will readily slide off the end of the prong 29, whereupon it becomes undone. There will, moreover, be no damage to the line from engagement with the hook.

In order to better adapt the hook 20 to handle lines extending in various directions, the mounting means of the hook may be fashioned with a swivel, as shown in Figs. 4 and 5. In such event, end portion 40 of the stem 24 remote from the toe 25 is bent approximately perpendicular and fitted into a swivel mounting bracket 41. The bracket 41 is formed with a U-shaped central offset 42 and a pair of outturned ears 44 having holes 45 for receiving mounting screws. The stem end portion 40 is rotatably carried in a pair of alined holes 46 in the offset 42 and retained against withdrawal as by means of one or more swedged lugs 48. In this instance, the lugs 48 happen to be square or rectangular in form. This prevents wearing or reaming out of the upper one of the holes 46 which might occur if the lugs 48 were of arcuate form.

By reason of the swivel mounting just described, the hook 20 may swing freely through as wide an angle as its associated support 26 permits (Fig. 5). The hook can readily swivel to accommodate itself to line tension applied from various angles. In cases where both line end portions 34 and 35 are tensioned from different directions, the hook 20 will swivel to an intermediate or "fairlead" position which will tend to equalize the two line tensions. Another advantage of the swivel mounting is that it minimizes the likelihood of injury to the user or to the hook when the same is struck accidentally. This permits the hook to be attached to the lower edge of a floor joist, for example, since it will simply pivot out of the way if a person inadvertently strikes it while walking under the joist.

Turning now to Figs. 6, 7, and 8, there are shown certain modifications of the hook 20 which also embody the present invention. In Fig. 6, for example, the hook 20 is provided with a mounting means in the form of a threaded extension 49 on the stem 24. In this instance, the threads happen to be of appropriate form to penetrate support 26 in the same manner as a wood screw.

Figs. 7 and 8 show the hook 20 with still another form of mounting means. In this case, such means happens to be a mounting pad 50 welded or otherwise rigidly fixed to the stem 24. The hook may be secured in place on a surface such as a boat deck by means of a pair of screws 51 which pass through appropriate holes in the pad 50. As shown in Fig. 7, the line 28 is secured to the hook 20 by means of an even simpler hitch than that shown in Figs. 1, 2, 3 and 6. In this instance, the line 28 is led through the V-clamp 31 and the end portion 35 is reversely bent about the prong 29 and then led through the throat 32. The other end portion 34 is reversely bent about the prong 29 and then reversely bent about the end portion 35 without going through the throat. Tension applied to the end portion 35 cinches up the hitch, gripping the line in the V-clamp and squeezing the end portion 34 between the hook and the end portion 35.

Referring next to Figs. 9 and 10, the hook 20 is shown with two alternative hitches which may, if desired, be used in securing of the line 28. To make the hitch shown in Fig. 9, the line 28 is led through the throat 32 and the end portion 34 is wrapped in a complete turn about the toe 25. The end portion 34 is then led through the V-clamp 31 and drawn toward the smaller end of the slot 30. Tension applied to the end portion 35 will cinch up the hitch and it will then withstand heavy loads without slippage. To make the hitch shown in Fig. 10, the line 28 is also led through the throat 32. The end portion 34 is then led under the end portion 35 and thence back on the same side of the toe, thence passing through the throat 32 and into the V-clamp 31 from the opposite side. Once the end portion 34 has been set in the V-clamp and the hitch cinched up by tension on the line 35, it too will hold substantial loads without slippage.

It will be appreciated by those skilled in the art that there has been provided a novel slip-proof hook and mode of attaching a flexible line thereto which eminently fulfill the objectives set forth earlier herein. The embodiments of the hook 20 disclosed herein have been shown as fabricated from rod stock or relatively heavy wire. While such construction possesses a number of advantages, it is within the scope of the invention to fabricate the hook 20 by various other techniques such as by sheet metal stamping or by casting.

I claim as my invention:

A self-tightening rope hook comprising a stiff rod having a straight stem adapted at one end to be anchored to a fixed support and formed at its other end with an arcuately shaped reverse bend portion terminating in an S-shaped end portion coplanar with and contained within the reverse bend of said stem portion, a part of said S-shaped portion bearing against the inside of said arcuately bent rod portion, the free end of said end portion defining a prong overlying the stem and forming therewith a wedge-shaped slot opening towards the anchor end of the stem so as to afford a wedged gripping engagement with a rope, whereby any increase in pull on a rope fastened around said prong and through said S-shaped portion pulls said S-shaped portion more tightly against the reverse bend portion of said rod.

References Cited in the file of this patent

UNITED STATES PATENTS

| | | |
|---|---|---|
| 152,860 | Parkhurst | July 7, 1874 |
| 605,123 | Nichless | June 7, 1898 |
| 793,505 | Clay | June 27, 1905 |
| 1,106,227 | Laurent | Aug. 4, 1914 |
| 1,380,378 | Hazlett | June 7, 1921 |
| 1,397,126 | Keenum | Nov. 15, 1921 |
| 1,548,927 | Barrell | Aug. 11, 1925 |
| 2,252,243 | Zoppelt | Aug. 12, 1941 |
| 2,299,794 | Carlson | Oct. 27, 1942 |

FOREIGN PATENTS

| | | |
|---|---|---|
| 6,338 | Great Britain | Mar. 16, 1906 |